Patented July 2, 1935

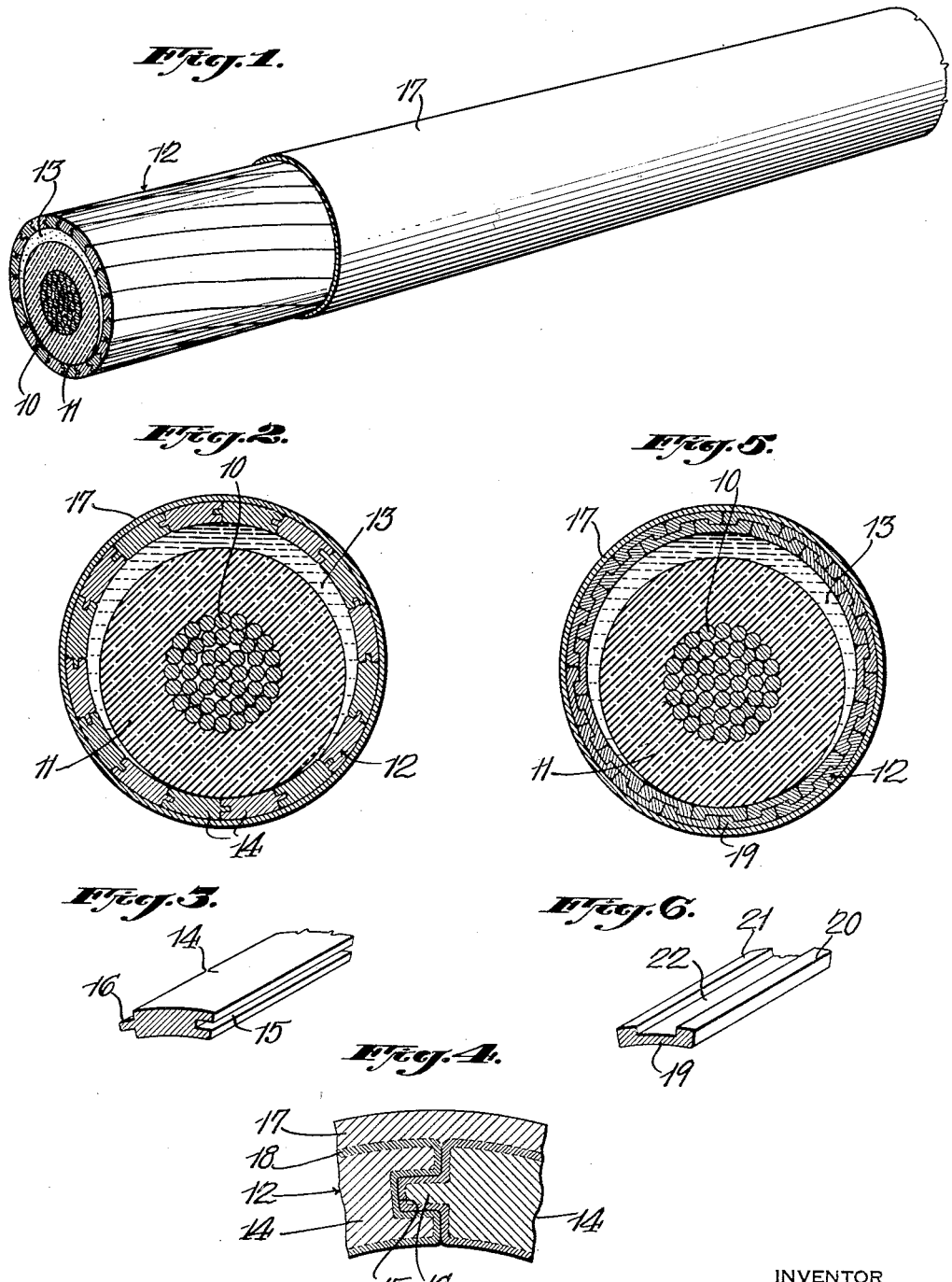

2,006,932

UNITED STATES PATENT OFFICE 2,006,932

ELECTRIC CABLE

Samuel J. Rosch, Yonkers, N. Y., assignor to Anaconda Wire & Cable Company, New York, N. Y., a corporation of Delaware Application November 29, 1933, Serial No. 700,182

2 Claims. (Cl. 173—266)

My invention relates to cables for high tension electric systems and more particularly to a flexible metallic sheathing for solid, oil or gas filled high tension cables.

In high tension cables of the so-called solid type, the conductor has been wound with tapes of paper or similar material impregnated with an insulating fluid, such as oil, and the conductor with its insulating wrappings has then been enclosed in an outer sheath, usually of lead tubing formed about the insulating wrapping.

During the daily load cycle or cycles, the cable constituents are alternately heated to high temperatures as a result of the power transmitted through the cable and are permitted to cool to lower temperatures when the load is decreased; these cycles being known as heating and cooling cycles.

During the heating part of the cycle, the oil or other impregnating fluid in the wrappings expands against the lead sheath at a rate which is approximately six to eight times as great as the expansion of the sheath itself. Consequently, either the lead sheath is forced beyond its normal expansion for a particular temperature, or the oil builds up a high internal pressure.

During the cooling period of the cycle, the oil contracts to its original volume, but the lead sheath, if it has been forced to expand beyond its normal rate of expansion is unable to contract to its original volume or space. The expansion of the lead sheath causes a diminution of its wall thickness and consequently a lowering of its resistance to the high internal pressures which may be built up within the cable. The internal pressures may assume such magnitude in commercial operation as to cause a bursting of the lead sheath, thereby rendering the cable inoperative because of the resulting drainage of oil from the insulating wrappings and consequent formation of voids which become susceptible to ionization and thereby form conducting paths to the sheathing.

When subjected to heating and cooling cycles, cables of the above type are susceptible to the formation of voids in various parts of the insulation and between the latter and the lead sheath. These voids may prove harmful to the successful operation of the cable, but if they are maintained under pressure they may be rendered harmless because their dielectric properties are thereby improved; the improvement being greater the greater the pressure. When a lead sheath is used, the magnitude of pressure is limited and may not be sufficient to render the voids harmless.

Another type of cable proposed in the art is one in which dry paper insulated cable or one in which the conductor or conductors are separated by some insulating barrier or spacer are enclosed within a sheath of some metallic material and the interior filled with a dry gas such as carbon dioxide, nitrogen or similar materials, or a liquid insulation with such gas in combination are maintained at high pressure.

Such proposed cables require pressures greater than those that lead sheath can withstand. Those metals or material that are capable of withstanding the pressures required for the above purposes are generally rigid and inflexible and, therefore, cannot be wound on reels and installed.

Objects of my invention are to provide a cable sheath that will withstand pressures higher than those of the ordinary lead sheath and sufficient to decrease the ionizations and conductance of voids for air spaces either in gas-filled cable or in a cable impregnated with an insulating liquid; and to provide a cable sheath made of metal or material capable of withstanding heavy pressures, but so formed as to have the requisite flexibility and yet be gas-tight and fluid-tight.

The various features of the invention as illustrated by way of example in the accompanying drawing in which Fig. 1 shows a perspective view of a section of cable, parts being removed to show the interior construction; Fig. 2 is a cross-sectional view of the cable shown in Fig. 1; Fig. 3 is an element of the cable sheath; Fig. 4 is a sectional view on an enlarged scale of a part of the cable sheath, showing the tinning of the cable elements shown in Fig. 3, and the union therewith of an outer coating; Figs. 5 and 6 are cross-sectional and detail perspective views of a modified form of cable, these figures being similar to those of Figs. 2 and 3.

In my invention the cable sheath is formed of a number of longitudinally extending elements arranged in cylindrical formation and having their adjacent edges interlocked to form a tightly closed space of cylindrical shape. These sheath elements may be of any suitable cross-sectional shape so that when assembled they interlock and form a cylindrical structure. They are preferably given a helical form. When the cable is bent, these various elements may slide relatively to each other. They are preferably plated with tin, or some other inert metal, and the outer surface is enclosed in a thin lead coating or jacket, compressed tightly on to the outer surface of the elements, and forming a close union therewith.

Referring more particularly to the accompanying drawing, a conductor 10 is enclosed in a wrapping 11 of paper or similar material impregnated with an insulating fluid, such as oil. In the example shown in the drawing, only one conductor is shown, but it will be understood that two or more conductors may be enclosed in a cable, each conductor being provided with a suitable insulating wrapping.

The conductor is illustrated as formed of a number of separate strands, but it will be understood that any suitable type of conductor may be employed. The insulated conductor thus formed is enclosed in a sheath 12, a space 13 being provided between the outer surface of the insulation and the inner surface of the sheath so as to provide for the ready passage or supply of insulating fluid to any part of the insulation through the length of the cable.

While the space 13 is shown as relatively large in comparison with the dimensions of the cable, it is to be understood that it may be made much smaller and may be reduced to the vanishing point.

The sheath 12 is formed of a number of longitudinal elements. In the modification shown in Figs. 2, 3 and 4, these elements are formed of slightly helical longitudinally extending strips 14 having partly inner and outer surfaces either flat or slightly curved to the curvature of the cable sheath and one edge of the plate is formed with a groove 15 while the opposite edge is formed with a tongue 16 so that when assembled in a sheath formation the tongue 16 of one strip enters the groove 15 of the next adjacent strip as shown in Figs. 1, 2 and 4. When thus assembled, the elements are tightly compressed and compacted by passing them through a die so as to leave a minimum spacing between the sections while still permitting the sections to slide one on the other. A thin coating of lead 17 is then compressed on to the outer surface of the sheathing thus formed, filling the outer spaces in the joints between the assembled sheath elements 14 and thereby improving the fluid tightness of the joints.

The flexibility and fluid tightness of the joints may be still further increased by tinning the surfaces of the elements 14 prior to their assembly so that they have a thin coating of tin as indicated at 18 in Fig. 4. When the lead sheath 17 is extruded tightly over these tin surfaces a superficial alloy is formed between these surfaces and the hot lead during extrusion causing a physically adhering bond between the outer surfaces of the sheath and the lead coating without the intrusion of the lead between the spaces of the adjacent members.

Tinning also serves to protect impregnating oils which in contact with certain metals undergo reactions through a catalytic action of the metal which tend to lower the electric properties of the oils or fluids. By coating such metals with tin or other non-reactive metals, this catalytic or chemical action may be eliminated or reduced to a minimum.

In the modification shown in Figs. 5 and 6, the cable sheath is formed of elements 19, there being an inner row of elements and an outer row, the edges of the outer row overlapping those of the inner row and having sliding projections 20 and 21 which leave a central space 22 so that the projections 20 and 21 of a pair of adjacent inner members project into the space 22 of the outer member and are locked together in this manner while similarly the projections of a pair of adjacent outer members enter and are held by a similar recess in an inner member, the outer and inner members being positioned in complementary or reversed relation as shown in Fig. 5, so as to interlock in the above manner.

The lead coating or jacket 17 is applied to the modification of Fig. 5 and the cable is otherwise the same as in Figs. 2, 3 and 4. The elements 19 may also be tinned and have the same freedom to slide relative to each other as the cable is bent.

Through the above invention, therefore, a cable sheath is provided having all of the strength of such metals as copper and its alloys, or steel and its alloys, and other metals having strength, while at the same time it avoids the stiffness and rigidity that would be present if the sheath were made of a continuous wall of such metal or alloy.

Various modifications may be made by those skilled in the art without departing from the invention as defined in the following claims.

What I claim is:

1. A cable sheath formed of a number of longitudinally extending helical elements interlocked to form a fluid-tight cylindrical enclosure while permitting the elements to slide relatively to each other, the surfaces of said elements being tinned and an outer lead jacket pressed on to said tinned surfaces and superficially alloyed therewith.

2. A cable having a conductor, a fluid impregnated insulation and a sheath, said sheath comprising a number of longitudinally extending helical elements slidably interlocked to form a complete enclosure for said insulation, said elements being tinned, and a lead covering pressed on a surface of said enclosure to fill spaces in the joints between said elements and to form a superficial bond with the tinned surfaces of said elements to render said enclosure fluid tight.

SAMUEL J. ROSCH.